(12) United States Patent
Ide et al.

(10) Patent No.: US 11,035,266 B2
(45) Date of Patent: *Jun. 15, 2021

(54) CRANKCASE FILTER ASSEMBLY

(71) Applicant: RB Distribution, Inc., Colmar, PA (US)

(72) Inventors: Stephen R. Ide, Nazareth, PA (US); Kunjan S. Khambhati, King of Prussia, PA (US); James Laverty, Pennsburg, PA (US)

(73) Assignee: RB Distribution, Inc., Colmar, PA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/960,081

(22) Filed: Apr. 23, 2018

(65) Prior Publication Data
US 2018/0238207 A1   Aug. 23, 2018

Related U.S. Application Data (63) Continuation of application No. 14/928,889, filed on Oct. 30, 2015, now Pat. No. 9,951,668.

(51) Int. Cl.
| | | |
|---|---|---|
| *B01D 50/00* | (2006.01) | |
| *F01M 13/04* | (2006.01) | |
| *B01D 45/08* | (2006.01) | |
| *B01D 36/00* | (2006.01) | |
| *B29C 65/00* | (2006.01) | |

(52) U.S. Cl.
CPC ........... *F01M 13/04* (2013.01); *B01D 36/001* (2013.01); *B01D 45/08* (2013.01); *B29C 65/00* (2013.01); *F01M 2013/0433* (2013.01); *F01M 2013/0438* (2013.01)

(58) Field of Classification Search
CPC ........... F01M 13/04; F01M 2013/0438; F01M 2013/0433; B01D 36/001; B01D 45/08
See application file for complete search history.

(56) References Cited

U.S. PATENT DOCUMENTS

| | | | |
|---|---|---|---|
| 2,866,519 | A | 12/1958 | Hazlett et al. |
| 4,012,209 | A | 3/1977 | McDowell et al. |
| 4,358,433 | A | 11/1982 | Pircon |
| 4,744,958 | A | 5/1988 | Pircon |
| 5,937,816 | A | 8/1999 | Wincewicz et al. |
| 6,290,738 | B1 | 9/2001 | Holm |
| 6,354,283 | B1 | 3/2002 | Hawkins et al. |
| 6,478,019 | B2 | 11/2002 | Fedorowicz et al. |
| 6,576,045 | B2 | 6/2003 | Liu et al. |
| 6,626,163 | B1 | 9/2003 | Busen et al. |

(Continued)

OTHER PUBLICATIONS

KLM Performance—6.7L Cummins Replacement Crank Case Vent Filter CV52001; (http://www.klmperformance.com/); retrieved Oct. 30, 2015.

*Primary Examiner* — Dung H Bui
(74) *Attorney, Agent, or Firm* — Volpe Koenig (57) ABSTRACT

A filter assembly that includes a separator for separating gas from a fluid. The assembly includes; a base with surrounding walls that define a fluid reservoir; a baffle that overlies at least a portion of the reservoir; a filter element that is beneath the baffle and in the reservoir; and, a cover that is removably fastened to the base and includes a fluid inlet that terminates in a conical base with an unrestricted opening and the baffle includes a fluid impact cone.

4 Claims, 7 Drawing Sheets

(56) References Cited

U.S. PATENT DOCUMENTS

| | | |
|---|---|---|
| 7,080,636 B2 | 7/2006 | Knaus et al. |
| 7,186,282 B2 | 3/2007 | Su |
| 7,582,130 B2 | 9/2009 | Ng et al. |
| 7,604,676 B2 | 10/2009 | Braziunas |
| 7,648,543 B2 | 1/2010 | Faber et al. |
| 7,959,714 B2 | 6/2011 | Smith et al. |
| 8,105,412 B2 | 1/2012 | Severance et al. |
| 8,152,884 B1 | 4/2012 | Severance et al. |
| 8,252,079 B2 | 8/2012 | Gruhler et al. |
| D671,201 S | 11/2012 | Yano et al. |
| 9,138,671 B2 | 9/2015 | Janakiraman et al. |
| 9,138,673 B2 | 9/2015 | Von Seggern |
| D769,328 S | 10/2016 | Ide et al. |
| D769,329 S | 10/2016 | Ide et al. |
| 2004/0011318 A1* | 1/2004 | Bonde .................... F02B 63/02 123/195 R |
| 2009/0193972 A1 | 8/2009 | Schwandt et al. |
| 2011/0023429 A1 | 2/2011 | Janakiraman et al. |
| 2014/0259924 A1 | 9/2014 | Leininger |

\* cited by examiner

CRANKCASE FILTER ASSEMBLY

FIELD OF INVENTION

The invention relates to a crankcase filter assembly of the type that employees the filter structure to provide inert separation of gas and liquid components as they pass through the filter.

BACKGROUND

Inertial gas-liquid separators are known for use, particularly in diesel engines, in separating gas from liquid particles in a gas-liquid stream by accelerating the stream through holes or nozzles to achieve separation. In some prior art assemblies, a collection surface is used for impingement, which causes separation of the liquid particle from the gas-liquid stream. As a general matter, the prior art assemblies have been effective in performing the separation. However, the prior art assemblies are sealed units that are not serviceable and can be subject to premature replacement due to particle build up caused by the configuration of the separation tube.

There is a need for a serviceable assembly and an efficient and economical replaceable filter element.

SUMMARY

The present invention provides a serviceable filter assembly and replaceable filter element for the assembly.

BRIEF DESCRIPTION OF THE DRAWING(S)

The invention will be more fully understood with reference to the drawings wherein the same number is used to identify like elements.

DETAILED DESCRIPTION OF THE PREFERRED EMBODIMENT(S)

Figure 1:
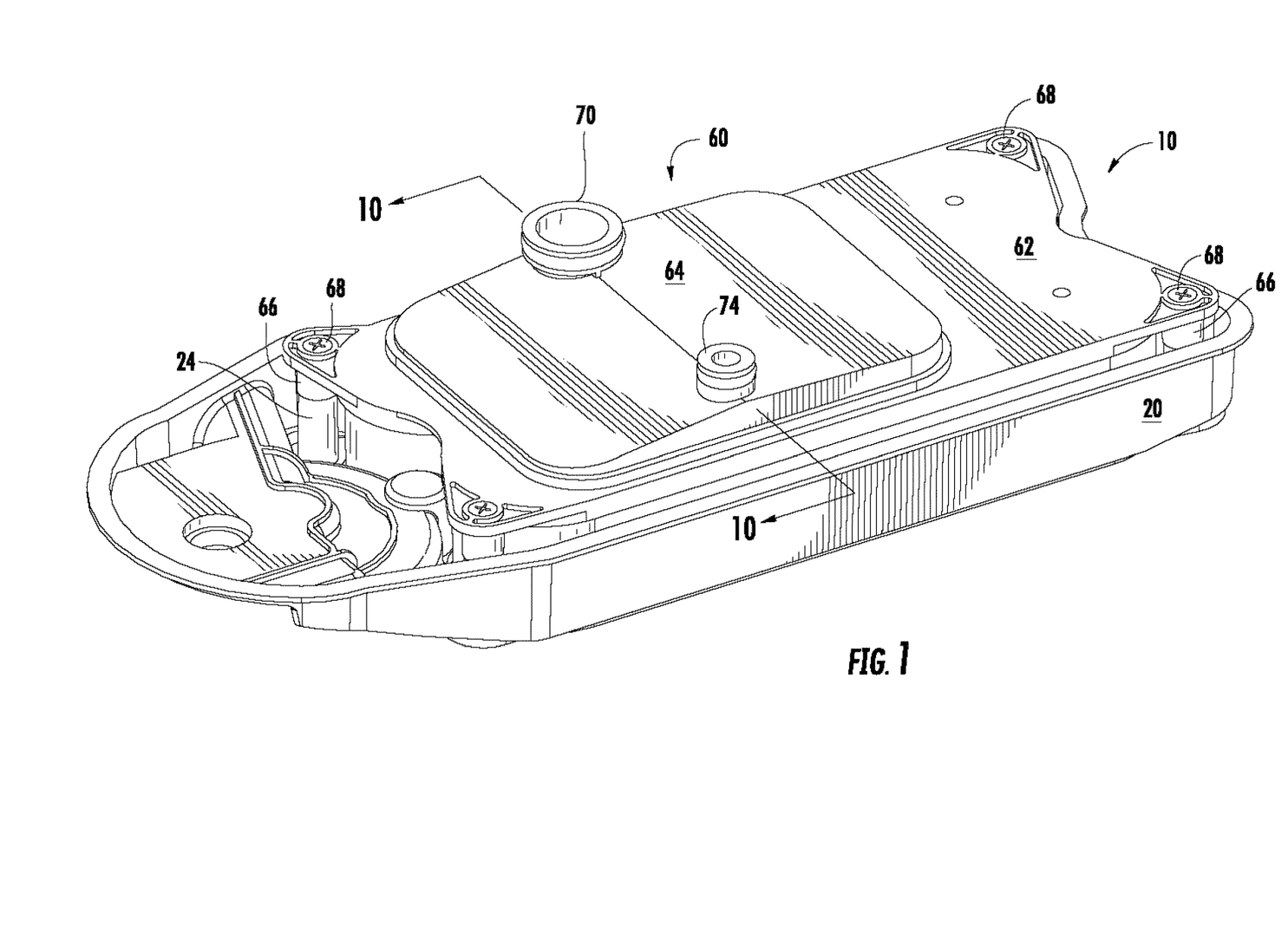
FIG. 1 illustrates a filter assembly with a removable cover that is configured to fit the prior art application.
Figure 2:
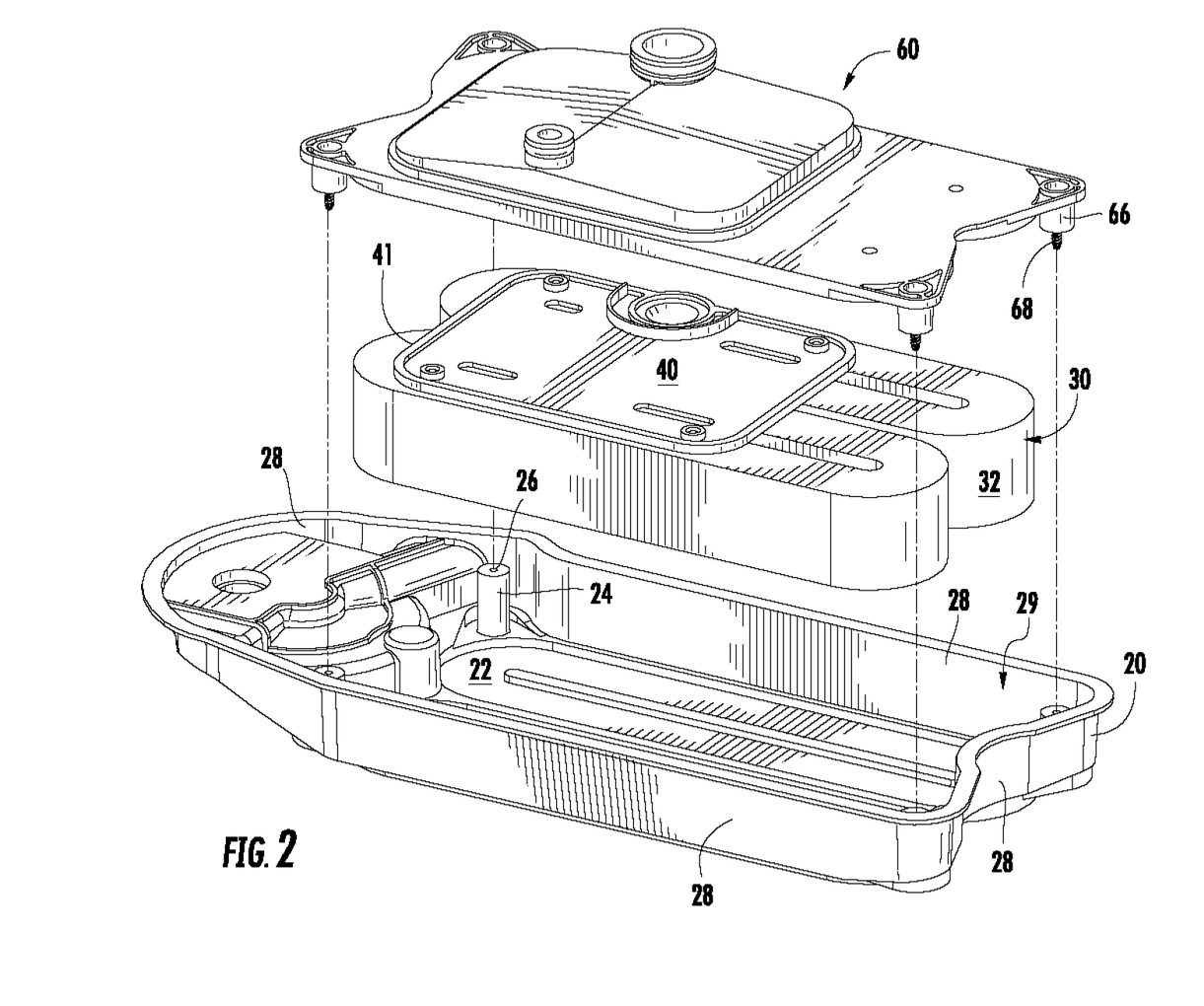
FIG. 2 is an exploded view of the assembly of FIG. 1 that illustrates the removable cover, the replaceable filter element and the associated baffle.

With reference to FIG. 1, the filter assembly 10 is dimensioned to fit in the preexisting position of a diesel engine and it essentially duplicates the exterior configuration of the existing filter with the exception of the interior features described below. The inlet tube 70 and outlet tube 74 are in the preexisting positions and use the respective preexisting connections associated with the diesel engine. The base 20 of the present filter assembly 10 differs from the existing assembly in that it has a plurality of post 24 that mates with a respective one of the fasteners associated with a corner post 66 of the cover 60 and joins them together. The cover 60 has generally flat top side 62 and a raised portion 64 that supports inlet tube 70 and outlet tube 74. With reference to FIG. 2, the exploded view shows the removable cover 60, the filter assembly 30, which includes the filter 32 and baffle 40. The recess 22 in base 20 essentially duplicates the preexisting filter except for the posts 24. The base 20 has surrounding walls 28 that define a fluid reservoir 29.

Figure 3:
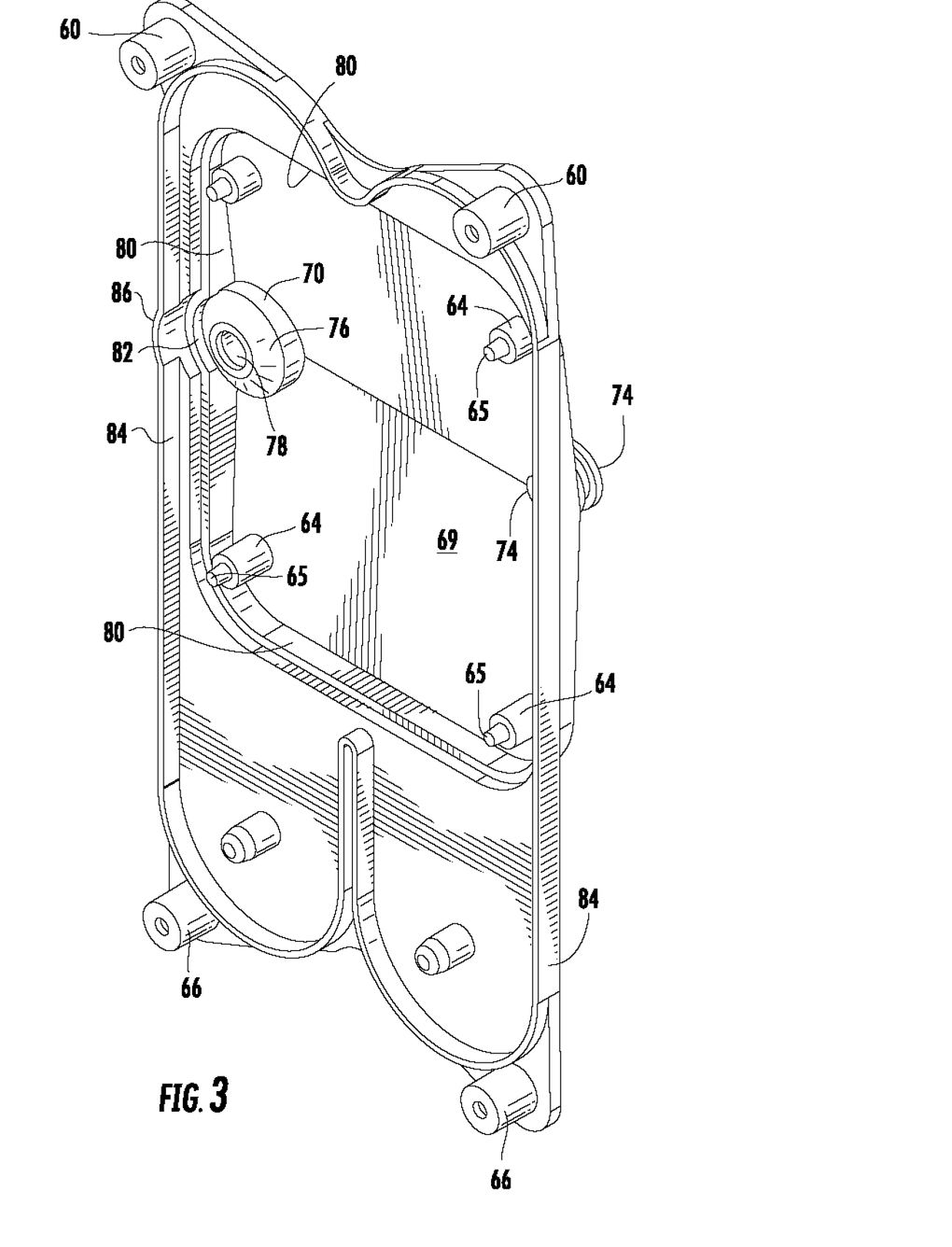
FIG. 3 is a bottom perspective view of the removable cover.
Figure 4:
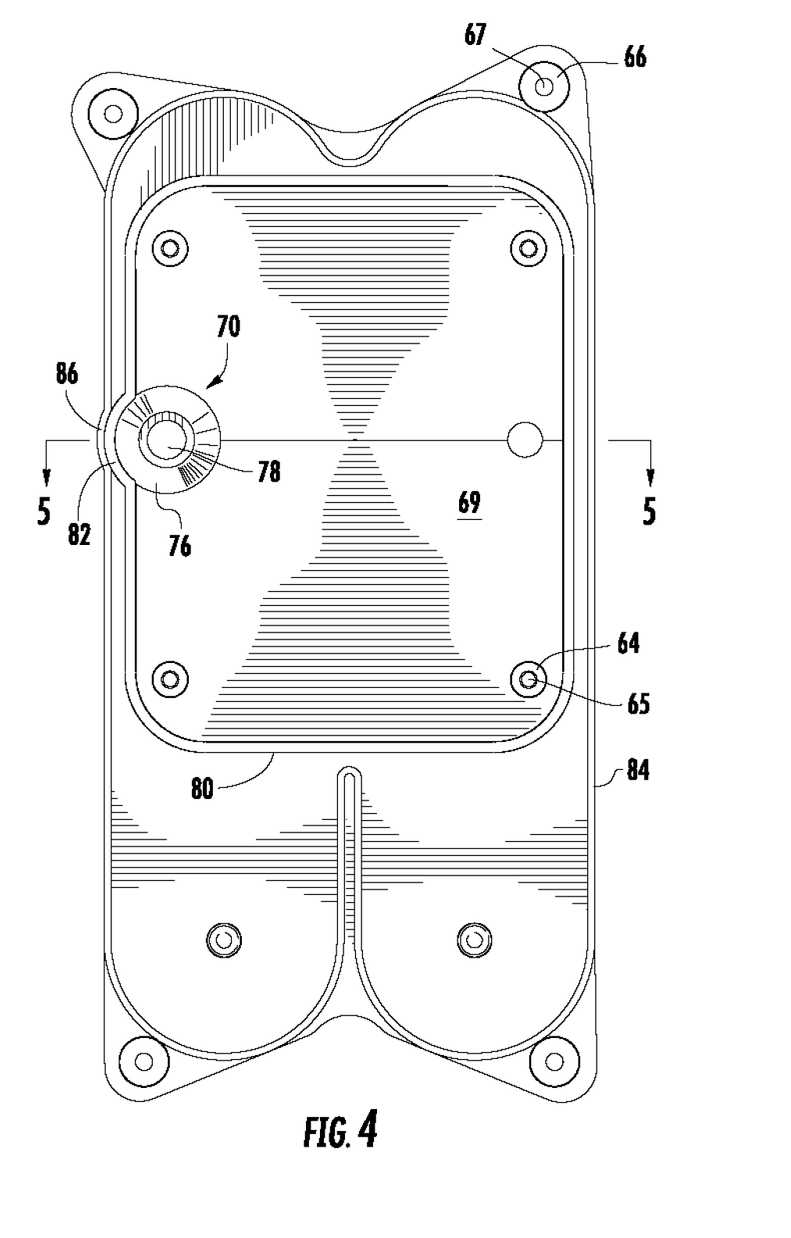
FIG. 4 bottom plan view of the removable cover.
Figure 5:
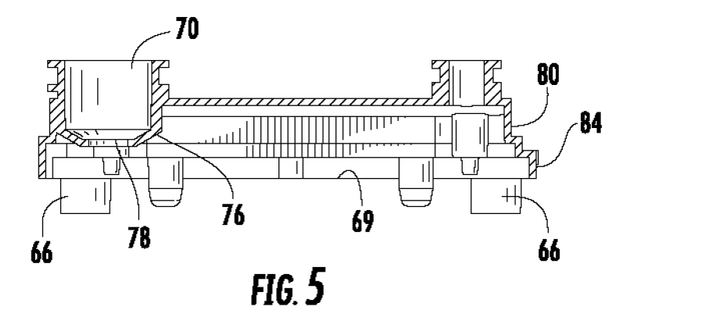
FIG. 5 is a section view along the line 5-5 of FIG. 4.

Turning to FIGS. 3 and 4, the underside of cover 60 has a recess 69 formed in cover 60 by the raised portion 64, see FIGS. 1 and 3. FIG. 3 also illustrates the raised portions 64 with pins 65 for connecting with the baffle 40 and corner posts 66 with fasteners 68 for connecting to the posts 24 of the base 20. The inlet tube 70 extends beneath the raised portion 64 of cover 60 and terminates in a downwardly directed conical base 76 that defines the unrestricted central aperture 78. FIG. 5 illustrates that the only restriction applied to the terminal end of inlet tube 70 is the conical base 76 and the central aperture 78 of conical base 76 is unrestricted. As shown in FIG. 3, perimeter 80 of the recess 69 including an arcuate section 82 and the outer perimeter wall 84 of the cover 60 includes a concentric section 86. The sections 82, 86, partially circumscribe the conical base 76.

Figure 6:
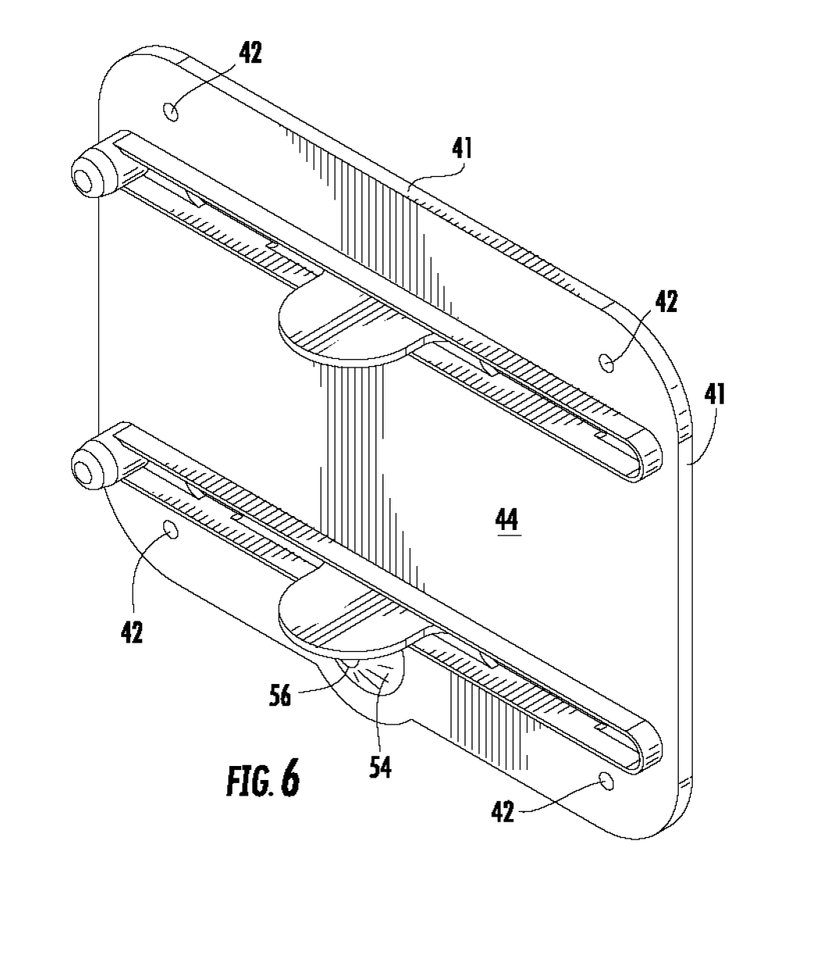
FIG. 6 is a bottom perspective view of the baffle without a filter element.
Figure 7:
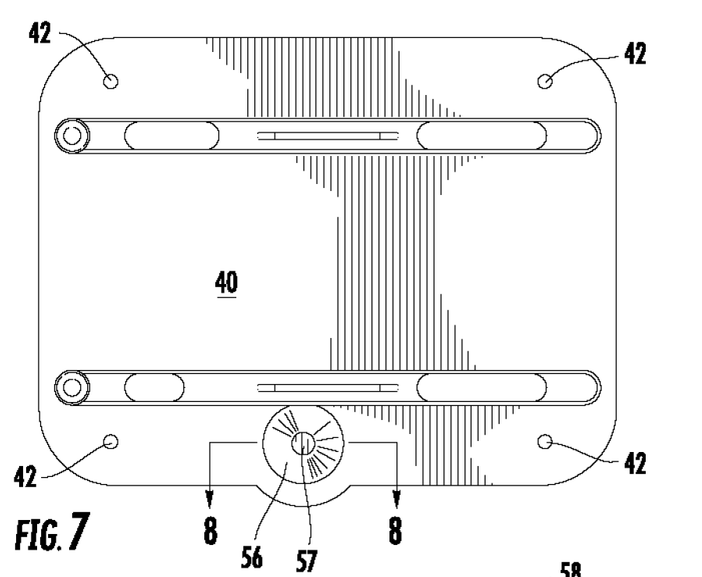
FIG. 7 is a bottom plan view of the baffle without a filter element.
Figures 8, 9:
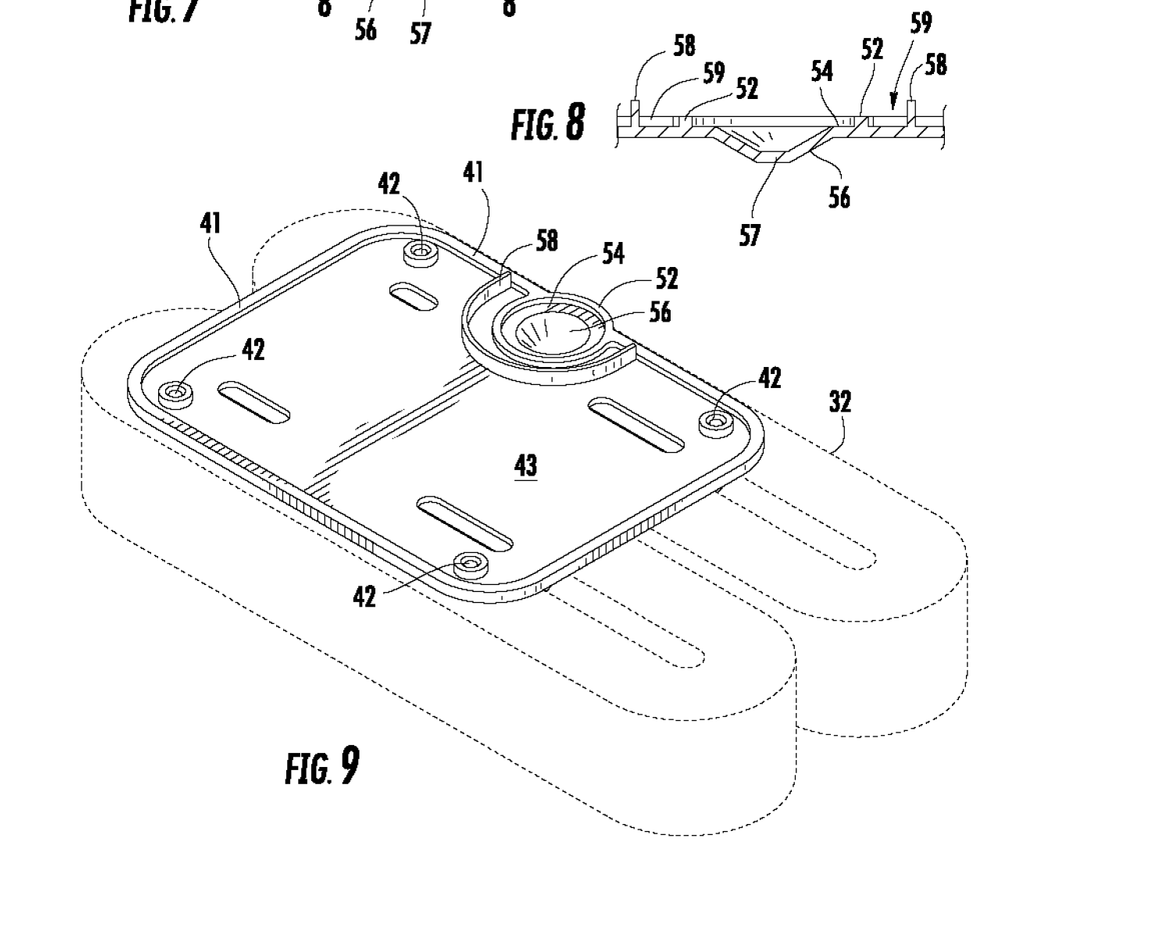
FIG. 8 is a section view along the line 8-8 of FIG. 7 that is rotated to show the orientation when assembled with a filter element.
FIG. 9 illustrates the baffle of FIGS. 6-8 as it is oriented with a known filter element; and, FIG. 10 is a section view along the line 10-10 of FIG. 1 with a portion of the filter removed for clarity.
Figure 10:
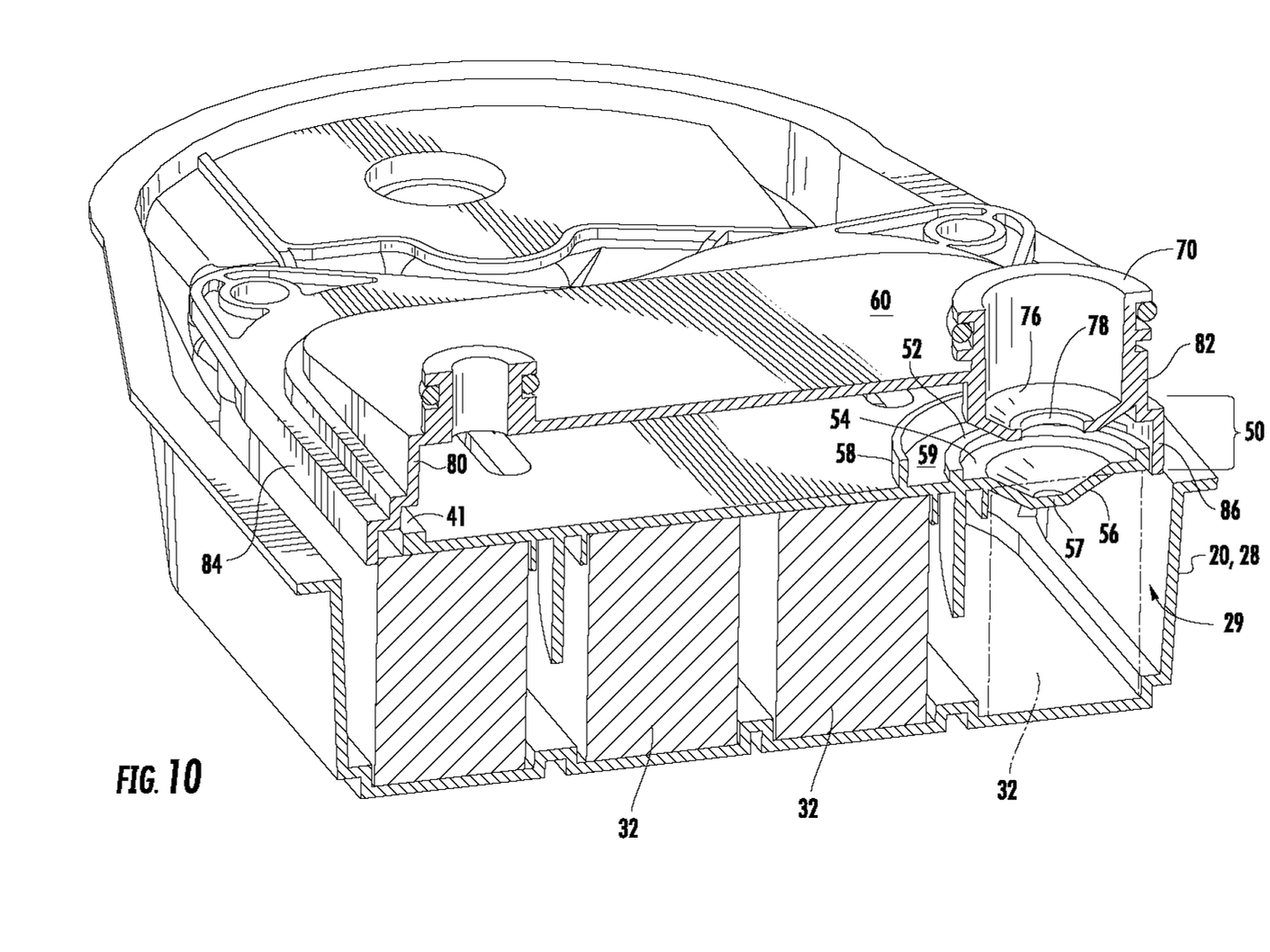

FIG. 6 illustrates the underside of the baffle 40, which is configured to accept a known filter 32 that is illustrated in FIG. 2. The apertures 42 through baffle 40 receive the pins 65 when the baffle 40 is assembled to the cover 60. Currently, the preferred fit between apertures 42 and pins 65 is a releasable press fit that is sufficient to hold the parts together for assembly with the base 20; however, other forms of connections that are secure and can be separated are usable. Since the remaining elements of baffle 40 seen on the filter facing surface 44 are found in the prior art, they are not described further herein. With reference to FIGS. 7 through 10, the baffle 40 has a portion in accordance with the invention that receives the conical base 76 and together with conical base 76 forms the separator 50 illustrated in FIG. 10. The fluid impact portion of separator 50 on cover facing surface 43 of baffle 40 has an upstand ring 52 and a flat ring 54 that are adjacent to and surround the conical recess 56, and a semi-circular wall 58 that meets the outer perimeter wall 41 of baffle 40 and is spaced from the other separator elements by the flat ring 59. As shown in FIG. 6, the upstand ring 52 adjoins the perimeter wall 41 of baffle 40. As shown in FIG. 10, when they are assembled, the semi-circular wall 58 also meshes with the concentric section 86 of the cover 60. The lower end 57 of conical recess 56 is a closed, generally flat surface.

As those skilled in the art will recognize by reference to FIG. 10, the present invention operates in the same manner as the prior art in that fluid entering inlet tube is accelerated by the conical base 76. The unrestricted central aperture 78 adds to the acceleration of the fluid directed toward the conical recess 56. The space provided in separator 50, between the conical base 76 and the conical recess 56, enables gas entrapped within the fluid to separate from the fluid. At the same time, the upstand ring 52 and semi-circular wall 58 control the fluid flow, which eventually overflows the semi-circular wall 58, flows cover facing surface of baffle 40 and drains down to the filter element.

What is claimed is:

1. A filter assembly comprising:
   a base with surrounding walls and a recessed fluid reservoir;

a filter element that is positioned within the recessed fluid reservoir;

a baffle with a filter facing surface and a cover facing surface and the filter facing surface overlies at least a portion of the filter element and has a plurality of apertures that are open to the filter element;

the baffle has a depression that is open on the cover facing surface and closed on the filter facing side;

a removable cover that is fastened to the base, the cover has a fluid inlet tube that overlies the depression in the baffle to form a separator;

whereby a fluid entering the fluid inlet tube impact the depression in the baffle and the fluid is separated into liquid and gas and the liquid is returned to the reservoir through the plurality of apertures wherein: the baffle depression is a conical recess that has a semicircular wall on the cover facing surface, and an upstanding ring that is concentric with the semicircular wall; and, the removeable cover has a concentric section of a perimeter wall that is concentric with the semicircular wall on the upper surface of the baffle.

2. The filter assembly of claim 1, wherein the baffle has a plurality of pin receiving apertures and the cover has a plurality of pins that are arranged to engage with a respective aperture among the plurality of apertures in the baffle in releasable press fits.

3. A gas from liquid separator comprising:

a base with surrounding walls that define a recessed filtering element receiving space within the surrounding walls;

a baffle with an outer perimeter that overlies at least a portion of the recessed space and at least a portion of the filtering element, and has a plurality of apertures;

the baffle includes a closed recess that is spaced from the recessed filtering element receiving space and is surrounded by an upstanding ring and a concentric semicircular wall of an outer perimeter of the baffle; and, a removable cover that has a plurality of pins that are arranged to engage with a respective aperture among the plurality of apertures in the baffle and an open base;

whereby the baffle and the cover form a gas from liquid separator wherein the recess of the baffle is coaxial with the open base of the cover, and the closed recess of the baffle terminates in a flat lower end.

4. The separator of claim 3, wherein the removable cover has an outer perimeter wall and the baffle has a semicircular wall that mesh with each other to define a separator position.

* * * * *